United States Patent
Masumiya et al.

(10) Patent No.: US 10,241,494 B2
(45) Date of Patent: Mar. 26, 2019

(54) CUTTING METHOD AND TOOL PATH GENERATING DEVICE

(71) Applicant: MAKINO MILLING MACHINE CO., LTD., Tokyo (JP)

(72) Inventors: Yasunori Masumiya, Aiko-gun (JP);
Kyohei Suzuki, Aiko-gun (JP);
Kazutoshi Yabe, Aiko-gun (JP);
Takashi Kageyama, Aiko-gun (JP)

(73) Assignee: MAKINO MILLING MACHINE CO., LTD., Tokyo (JP)

(*) Notice: Subject to any disclaimer, the term of this patent is extended or adjusted under 35 U.S.C. 154(b) by 143 days.

(21) Appl. No.: 15/114,258

(22) PCT Filed: Jan. 28, 2014

(86) PCT No.: PCT/JP2014/051834
§ 371 (c)(1),
(2) Date: Jul. 26, 2016

(87) PCT Pub. No.: WO2015/114734
PCT Pub. Date: Aug. 6, 2015

(65) Prior Publication Data
US 2017/0010599 A1    Jan. 12, 2017

(51) Int. Cl.
*G05B 19/29* (2006.01)
*B23C 3/12* (2006.01)
*G05B 19/4093* (2006.01)

(52) U.S. Cl.
CPC ............. *G05B 19/29* (2013.01); *B23C 3/12* (2013.01); *G05B 19/40937* (2013.01);
(Continued)

(58) Field of Classification Search
None
See application file for complete search history.

(56) References Cited

U.S. PATENT DOCUMENTS 5,378,091 A * 1/1995 Nakamura ......... B23Q 11/1023
                                              279/20
5,668,930 A * 9/1997 Hamura ............... G05B 19/425
                                              700/252
(Continued)

FOREIGN PATENT DOCUMENTS

JP    7-124812    5/1995
JP    11-10426    1/1999
(Continued)

OTHER PUBLICATIONS

International Search Report dated Mar. 11, 2014, directed to PCT Application No. PCT/JP2014/051834; 2 pages.

*Primary Examiner* — Tuan C Dao
(74) *Attorney, Agent, or Firm* — Morrison & Foerster LLP (57) ABSTRACT

A cutting method in which a workpiece is cut on the basis of a plurality of tool paths parallel to one another into a shape having a corner that protrudes outward. A machining step for machining the workpiece on the basis of one tool path and a moving step for moving to the starting point of the next machining step after the completion of the one machining step are repeated. In the machining step, a cutting step for cutting the workpiece in the one tool path and a removing step for removing a burr by moving a tool relatively to the workpiece in the same tool path as that of the cutting step in a region forming the corner are successively performed.

8 Claims, 6 Drawing Sheets

(52) U.S. Cl.
CPC ............... *B23C 2220/20* (2013.01); *G05B 22 19/45151* (2013.01); *G05B 2219/49392* (2013.01); *Y02P 90/265* (2015.11)

(56) References Cited

U.S. PATENT DOCUMENTS

| | | | |
|---|---|---|---|
| 2005/0172764 A1* | 8/2005 | Fagan | B23K 7/105 83/13 |
| 2010/0087949 A1* | 4/2010 | Coleman | G05B 19/40937 700/189 |
| 2011/0251715 A1* | 10/2011 | Diehl | G05B 19/40937 700/191 |

FOREIGN PATENT DOCUMENTS

| | | |
|---|---|---|
| JP | 2001-277031 | 10/2001 |
| JP | 2005-305595 | 11/2005 |
| JP | 2013-151030 | 8/2013 |
| JP | 213-233643 | 11/2013 |
| JP | 2013-233643 | 11/2013 |
| WO | 2011/142372 | 11/2011 |

* cited by examiner

CUTTING METHOD AND TOOL PATH GENERATING DEVICE

CROSS-REFERENCE TO RELATED APPLICATIONS

This application is a U.S. National Stage patent application of International Patent Application No. PCT/JP2014/051834, filed Jan. 28, 2014, which is hereby incorporated by reference in the present disclosure in its entirety.

FIELD OF THE INVENTION

The present invention relates to a cutting method and a tool path generation device.

BACKGROUND OF THE INVENTION

In conventional techniques, a machine tool which rotates a rotating tool to machine a workpiece is known. Among such machine tools, a numerical control type machine tool which specifies a path of the rotating tool by using coordinates on predetermined axes or the like, and machines a workpiece while automatically making relative movements of the rotating tool with respect to the workpiece is known. Such machine tool can perform the cutting operation on a workpiece by using a milling cutter tool as the tool.

When a workpiece is cut, a small projection on a machined surface may be produced on the periphery of a cut area. Such a projection, referred to as a burr, needs to be removed after the workpiece surface is cut in order to obtain a desired shape.

Japanese Laid-open Patent Publication No. 2013-151030A discloses a method for cutting a die with a cutting tool which is moved while being rotated, the method includes moving the cutting tool in a predetermined direction, and then moving the cutting tool in a direction opposite to the predetermined direction. There is disclosed that the cutting method achieves removing a burr which has been produced during the cutting of the die.

PRIOR ART DOCUMENTS

Patent Literature 1: Japanese Laid-open Patent Publication No. 2013-151030A

SUMMARY OF INVENTION

Some methods for machining a workpiece with a machine tool include machining the workpiece while moving a tool along a plurality of tool paths parallel to one another. For example, the machining may be performed by moving a tool on a plane parallel to an X-Y plane while keeping the tool at a position in the axial direction (Z-axis direction) of the spindle in the machine tool. Such cutting may also produce a burr on a corner of the workpiece. If a workpiece has a lot of corners, burrs may be produced on a lot of corners. The aforementioned Japanese Laid-open Patent Publication No. 2013-151030A does not disclose a method for effectively removing a burr produced on a corner of a workpiece.

Burrs produced during workpiece cutting can be manually removed by an operator. However, the operator will have an increased workload to prolong the time for machining the workpiece, and thus the productivity of workpieces will be reduced. In particular, for machining a workpiece to make a target shape having a lot of corners, it takes a long time due to the need for removing burrs produced on the individual corners.

Alternatively, in order to reduce creation of burrs, the relative speed of the tool with respect to a workpiece can be decreased. In other words, decreasing the cutting speed can reduce burrs being produced. However, this method is still problematic in that the time period for machining workpieces is extended.

Solution to Problem

A cutting method according to the present invention is a cutting method with a machine tool for cutting a workpiece based on a plurality of tool paths parallel to one another to machine the workpiece into a shape which includes a corner projecting outward, the method including a step of repeatedly performing a machining step of machining the workpiece based on one tool path, and a moving step of moving to a start point of a step of machining based on another tool path parallel to the one tool path after completion of the machining step based on the one tool path. The machining step includes a cutting step of cutting a workpiece on the one tool path and a removal step of removing a burr produced on the corner by making a relative movement of a tool with respect to the workpiece on the same tool path and in the same direction as those for the cutting step in an area forming the corner, and the cutting step based on the one tool path and the removal step are performed in succession.

According to the aforementioned invention, the removal step can include a step of removing burrs by making a relative movement of the tool with respect to the workpiece on the same tool path as the whole of the one tool path.

According to the aforementioned invention, the one tool path includes a straight area where a relative movement of the tool is made with respect to the workpiece in a straight manner and a curved area forming the corner, and the removal step can include a step of making a relative speed of the tool with respect to the workpiece in the straight area higher than a relative speed of the tool with respect to the workpiece in the curved area.

According to the aforementioned invention, the removal step can include a step of making a relative movement on a tool path which deviates from the one tool path in areas on the one tool path except an area forming the corner.

According to the aforementioned invention, the machining step can include a step of machining on a side of the tool while keeping the tool at a certain relative position with respect to the workpiece in an axial direction of a spindle in the machine tool.

According to the aforementioned invention, the machining step can include a step of machining on a bottom of the tool while making a relative movement of the tool with respect to the workpiece in a straight manner when the workpiece is seen from an axial direction of a spindle in the machine tool.

A tool path generation device according to the present invention generates tool paths for machining a workpiece into a shape with a corner projecting outward, the tool paths including a plurality of tool paths parallel to one another for cutting the workpiece, the tool path generation device including a path generation part which generates a machining tool path for machining the workpiece based on one tool path, and a moving tool path for moving to a start point of a machining tool path based on another tool path parallel to the one tool path after completion of the machining based on the one tool path. The machining tool path includes a cutting tool path including the one tool path for cutting the workpiece, and a removal tool path for removing a burr produced on the corner by making a relative movement of the tool with respect to the workpiece on the same tool path and in the same direction as those for the cutting tool path in an area where the corner is formed. The path generation part generates the cutting tool path based on the one tool path and successively generates the removal tool path based on the one tool path.

According to the aforementioned invention, the path generation part can set an area where the corner is formed, and can generate the removal tool path which deviates from the one tool path in areas except an area where the corner is formed.

According to the present invention, there can be provided a cutting method for preventing burrs from being left when a workpiece is machined, and a tool path generation device generating a tool path for preventing burrs from being left.

DETAILED DESCRIPTION OF THE INVENTION

A cutting method and a tool path generation device according to an embodiment will now be described with reference to FIGS. 1 to 10. The machining according to the present embodiment is a cutting operation for machining a workpiece into a desired shape by cutting off part of the workpiece. The cutting of the workpiece can be performed with a numerical control type machine tool.

Figure 1:
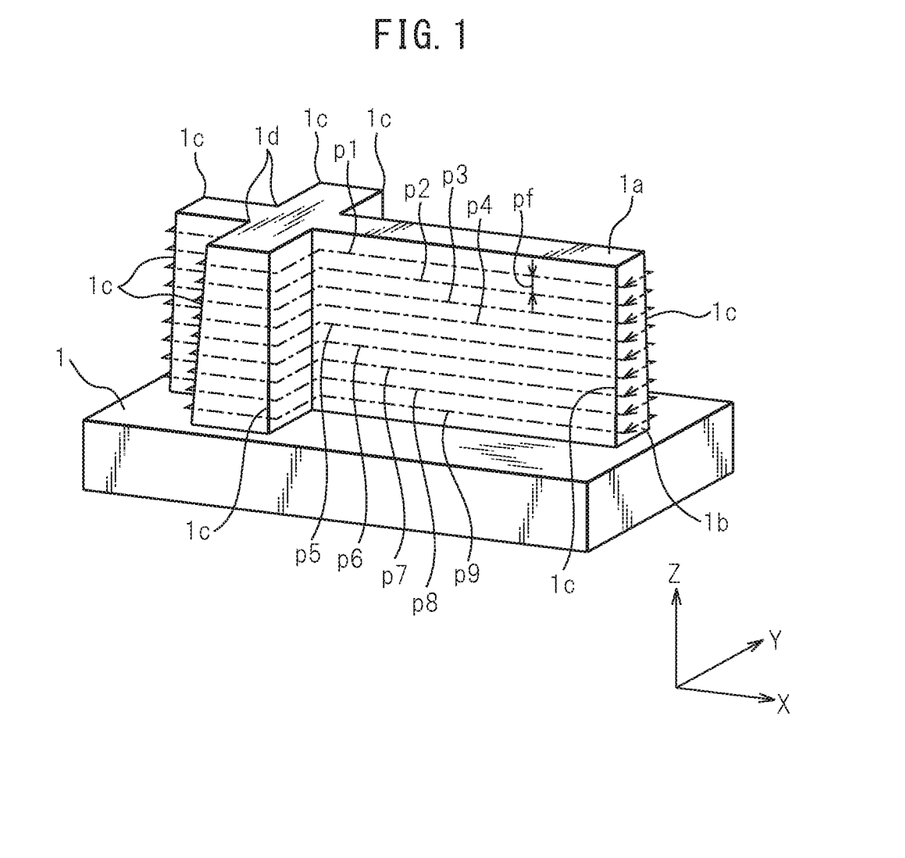
FIG. 1 is an explanatory schematic perspective view of a workpiece illustrating tool paths for machining a first workpiece according to an embodiment.

FIG. 1 is a schematic perspective view of the workpiece which has been machined into the target shape by using a first cutting method according to an embodiment. According to the first cutting method, sides of the cuboidal workpiece 1 are cut to form the workpiece 1 into a cross shape on its plane.

Figure 2:
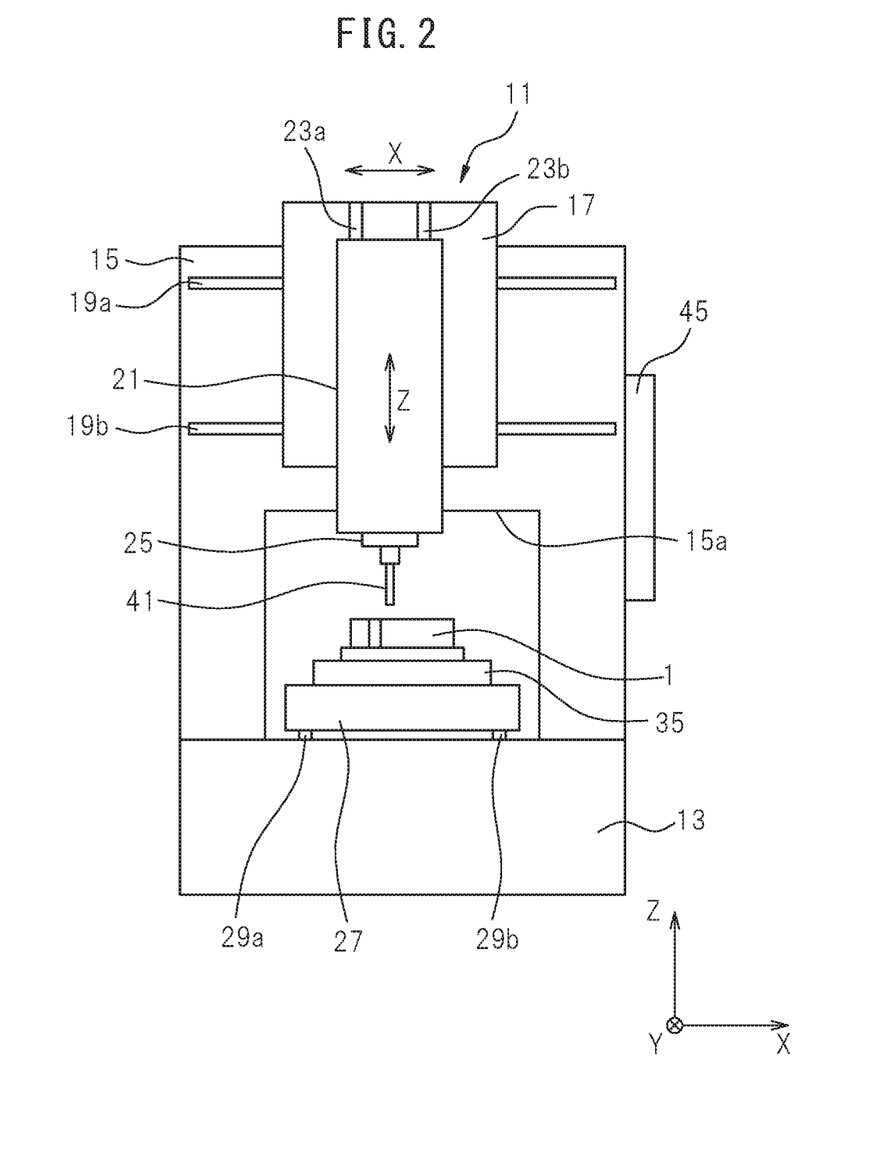
FIG. 2 is a schematic front view of a numeric control type machine tool according to an embodiment.

FIG. 2 is a schematic front view of a machine tool according to the present embodiment. The machine tool 11 includes a bed 13 serving as a base table and a column 15 vertically disposed on the top surface of the bed 13. A carriage 27 is disposed on top of the bed 13. On the top surface of the carriage 27, a table 35 for holding the workpiece 1 is disposed. The workpiece 1 is fixed to the table 35 through a holding member.

On the front surface of the column 15, a saddle 17 is disposed. In addition, on the front surface of the saddle 17, a spindle head 21 is disposed. Inside the spindle head 21, a spindle 25 is disposed. To the spindle 25, a tool 41 for machining the workpiece 1 is attached. The tool 41 rotates about the axis of the spindle 25.

The machine tool 11 according to the present embodiment has three linear feed axes perpendicular to one another, namely an X-axis, a Y-axis, and a Z-axis. The machine tool 11 includes a movement device which changes a relative position between the tool 41 and the workpiece 1. In the present embodiment, the axis extending along the axis of the spindle 25 (the vertical direction in FIG. 2) is referred to as Z-axis. The axis extending along the moving direction of the saddle 17 (the horizontal direction in FIG. 2) is referred to as X-axis. The axis extending along the moving direction of the carriage 27 (the direction perpendicular to the sheet in FIG. 2) is referred to as Y-axis. The movement device includes an X-axis movement device, a Y-axis movement device, and a Z-axis movement device. Relative movements of the tool 41 with respect to the workpiece 1 can be made in each of the axial directions.

The X-axis movement device includes a pair of X-axis rails 19a and 19b, which are formed on the front surface of the column 15. The saddle 17 is formed so as to be able to reciprocate along the X-axis rails 19a and 19b. The X-axis movement device includes an X-axis servo motor for moving the saddle 17. The spindle head 21 and the tool 41 move along with the saddle 17 in the X-axis direction.

The Y-axis movement device includes a pair of Y-axis rails 29a and 29b, which are disposed on the top surface of the bed 13. The carriage 27 is formed so as to be able to reciprocate along the Y-axis rails 29a and 29b. A hollow part 15a is formed in the column 15 so that the carriage 27 can move in the Y-axis direction. The carriage 27 enters the inside of the hollow part 15a when moving. The Y-axis movement device includes a Y-axis servo motor for moving the carriage 27. The table 35 and the workpiece 1 move along with the carriage 27 in the Y-axis direction.

The Z-axis movement device includes a pair of Z-axis rails 23a and 23b, which are formed on the front surface of the saddle 17. The spindle head 21 is formed so as to be able to reciprocate along the Z-axis rails 23a and 23b. The Z-axis movement device includes a Z-axis servo motor for moving the spindle head 21. The tool 41 moves along with the spindle head 21 in the Z-axis direction. In addition, inside the spindle head 21 is disposed a rotation drive motor for rotating the spindle 25 about the axis.

The machine tool 11 according to the present embodiment includes a control device 45. The control device 45 includes an arithmetic processing device. The arithmetic processing device has a microprocessor (CPU) which performs arithmetic processing and the like, ROM (Read Only Memory) and RAM (Random Access Memory) serving as a storage device, and other peripheral circuits. The control device 45 is connected to each of the respective axis servo motors in the movement devices and to the rotation drive motor inside the spindle head 21. The control device 45 controls the movement devices so that relative movements of the tool 41 can be made with respect to the workpiece 1. In addition, the control device 45 drives the rotation drive motor so that the tool 41 can be rotated at a desired rotation speed.

With reference to FIG. 1 and FIG. 2, in the first cutting method, a flat end mill can be used as the tool 41. The first cutting method includes machining the workpiece 1 while making relative movements of the tool 41 in the X-axis direction and Y-axis direction with respect to the workpiece 1, with the tool 41 kept at a certain height in the Z-axis direction. The machining while keeping the tool at a relative position with respect to the workpiece in a predetermined direction is referred to as contour machining, which is performed in the first cutting method.

FIG. 1 illustrates a plurality of tool paths p1 to p9 for machining the workpiece 1. A tool path, as used herein, means a path along which the tool moves relative to the workpiece. For example, a tool path is the path along which the tool center moves when the tool 41 moves relative to the workpiece 1. Individual tool paths p1 to p9 run in parallel with one another. The tool paths p1 to p9 each are on a plane parallel to an X-Y plane. In other words, the first cutting method includes performing the cutting on a side of the tool 41 while keeping the tool 41 at a certain relative position with respect to the workpiece 1 in the Z-axis direction.

In the contour machining, the tool can move to another adjacent tool path after the machining based on one of a plurality of tool paths is finished. An amount of this moving is referred to as a pick feed pf. Since there are a plurality of tool paths parallel to one another, the machining is performed a plurality of times by shifting to another tool path by the pick feed pf. For example, the workpiece 1 is cut through a relative movement of the tool 41 based on the tool path p1. Upon completion of the cutting based on the tool path p1, a relative movement of the tool 41 is made along the tool path p2 to cut the workpiece 1. In this way, repeated cutting based on tool paths from the tool path p1 to the tool path p9 can achieve machining the workpiece 1 into the target shape.

The example workpiece 1 in FIG. 1 represents that there are nine tool paths parallel to one another. The workpiece is gradually cut from the top 1a to the bottom 1b of the workpiece 1. The target shape of the workpiece 1 has a plurality of corners 1c projecting outward when seen in a planar view. In other words, there are convex corners 1c.

Figure 3:
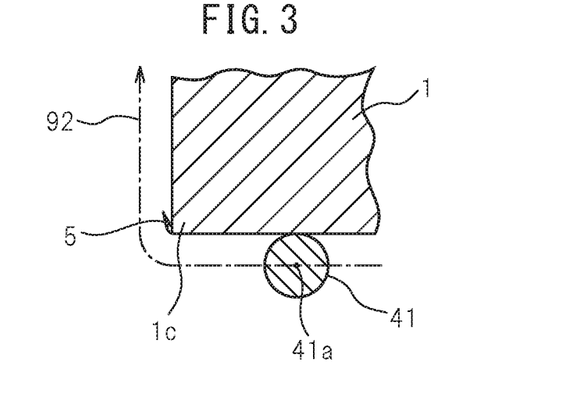
FIG. 3 is an enlarged schematic cross-sectional view of a corner of the first workpiece according to an embodiment.

FIG. 3 is an enlarged schematic cross-sectional view of a corner of the workpiece. To form a corner 1c of the workpiece 1, a relative movement of the tool 41 is made along the shape of the corner 1c. An arrow 92 corresponds to a tool path for the cutting. A tool center 41a moves along the arrow 92. During the cutting, a burr 5 may not be produced on a corner 1d, which is concaved inward in the target shape, whereas a burr 5 may be produced projecting from the target shape when an outward projecting corner 1c is formed.

With reference to FIG. 1, in particular, the bottom 1b is thicker than the top 1a in the shape of the workpiece 1 which has been machined. The target shape of the workpiece 1 is outward inclined toward the bottom 1b. The cutting into such target shape is performed, for example, for the purpose of forming a draft angle on a die.

When the workpiece 1 has an identical thickness from the top 1a through the bottom 1b, any adjacent tool paths overlap with each other when seen in a planar view. In this case, if a burr is produced during the cutting along the tool path p1, the burr may be removed by a cutting edge located in an area near the shank of the tool during the cutting along the tool path p2. However, if tool paths are shifted from each other when seen in a planar view, produced burrs will be left. Thus, the cutting method according to the present embodiment includes a removal step of removing a burr 5 which has been produced on a corner 1c, in addition to the cutting step of cutting the workpiece 1.

The cutting method according to the present embodiment includes a machining step of machining a workpiece based on one tool path. For example, with reference to FIG. 1, the machining step of machining a workpiece is performed based on the tool path p1. This step is followed by a moving step of changing the relative position of the tool 41 with respect to the workpiece 1 by a predetermined amount of movement from the end point of the machining step which is based on the one tool path. In the moving step, the tool is moved to the start point of the machining step based on another tool path parallel to the one tool path. Then, the next machining step is performed. For example, upon completion of the machining step based on the tool path p1, a relative movement of the tool 41 is made by the amount of movement indicated by the pick feed pf. Then, the machining step of machining the workpiece 1 based on the tool path p2 is performed. Such machining step and moving step are repeated.

Figure 4:
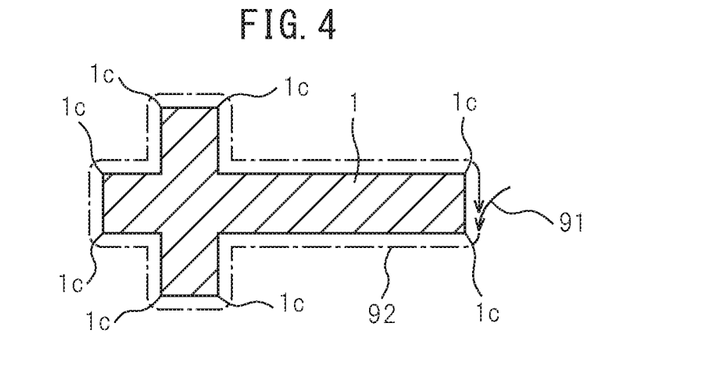
FIG. 4 is an explanatory schematic cross-sectional view illustrating a cutting tool path for cutting the first workpiece.

FIG. 4 is an explanatory schematic cross-sectional view of the workpiece illustrating the cutting step of cutting the workpiece on one tool path. The one tool path is indicated by an arrow 92. The arrow 92 corresponds to, for example, the tool path p1. First, as indicated by an arrow 91, the tool 41 is moved from a predetermined position to the start point of the machining step. The machining step includes the cutting step of cutting the workpiece on one tool path. In the cutting step, as indicated by the arrow 92, a relative movement of the tool 41 is made along the target shape of the workpiece 1 to cut the workpiece 1. A tool path for the cutting step is hereinafter referred to as cutting tool path.

Figure 5:
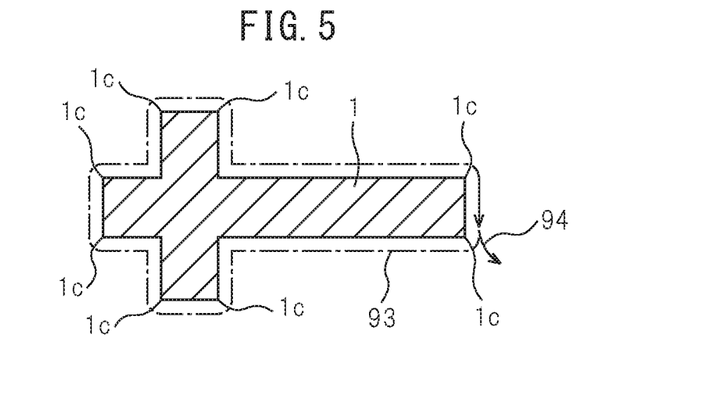
FIG. 5 is an explanatory schematic cross-sectional view illustrating a removal tool path for removing a burr produced on a corner of the first workpiece.

FIG. 5 is an explanatory schematic cross-sectional view of the workpiece illustrating the removal step of removing burrs. The machining step includes the removal step of removing a burr produced on a corner 1c. In the removal step, a relative movement of the tool 41 is made with respect to the workpiece 1 along the same tool path and in the same direction as those for the cutting step. In the removal step, as indicated by an arrow 93, a relative movement of the tool 41 is made along the target shape of the workpiece 1. The arrow 93 corresponds to, for example, the tool path p1. The tool path for such removal step is hereinafter referred to as removal tool path. In the removal step, a burr 5 produced on a corner 1c can be removed when the tool 41 passes an area forming the corner 1c. Upon completion of the removal step, the tool 41 is taken away from the removal tool path as indicated by an arrow 94.

In the removal step illustrated in FIG. 5, a relative movement of the tool 41 is made with respect to the workpiece 1 on the same tool path as the whole of the one tool path. In other words, the tool moves along the same tool path twice in succession. The first relative movement represents the cutting step of cutting the workpiece 1, whereas the second relative movement represents the removal step of removing a burr which has been produced on a corner 1c. Such tool path including a cutting tool path and a removal tool path involved in a single machining step is hereinafter referred to as machining tool path.

In the following moving step, the tool moves to the start point of a machining step based on another tool path. For example, the tool moves to the start point of a machining step based on the tool path p2. Then the cutting step and the removal step are performed. In this way, performing the individual machining steps based on the corresponding tool paths p1 to p9 achieves cutting the workpiece 1 from the top 1a to the bottom 1b.

Figure 6:
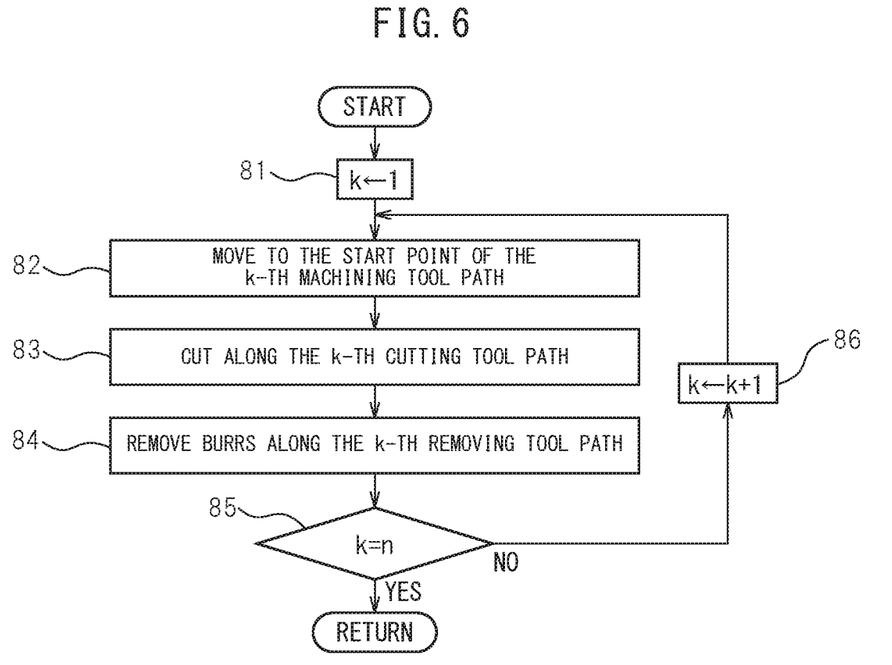
FIG. 6 is a flow chart for the cutting method according to an embodiment.

FIG. 6 illustrates a flow chart for the cutting method according to the present embodiment. A variable k represents the number for any of a plurality of tool paths. First, 1 is assigned to the variable k in Step 81. In Step 82, the tool moves to the start point of the first machining tool path. In the example illustrated in FIG. 1, the tool moves to the start point of the tool path p1.

Next, in Step 83 and Step 84, the first machining step is performed. In Step 83, the first cutting step, i.e., making a relative movement of the tool 41 on the first cutting tool path to cut the workpiece 1, is performed. For example, the workpiece 1 is cut based on the first tool path p1. Next, in Step 84, the first removal step, i.e., making a relative movement of the tool 41 on the first removal tool path, is performed. For example, burrs are removed on the first tool path p1. Burrs produced in the area which has been cut in the first cutting step can be removed.

Next, in Step 85, it is judged whether the variable k is equal to n, which represents a predetermined number of machining steps. In the example illustrated in FIG. 1, the number of machining steps n is 9, and thus it is judged whether the variable k is 9. If the variable k does not reach the number of times n yet in Step 85, the control transitions to Step 86.

In Step 86, 1 is added to the variable k. Then, back in Step 82, the tool moves to the start point of the second machining tool path. In other words, the tool moves to the start point of the next machining tool path. In the example illustrated in FIG. 1, the tool moves to the start point of the second tool path p2, and subsequently the second machining step is performed in Step 83 and Step 84.

In this way, Step 82 to Step 84 are repeated until the variable k reaches the number of times n. In other words, the machining step which includes the cutting step and the removal step is repeated n times. When the variable k reaches the number of times n in Step 85, the control is ended. In the example illustrated in FIG. 1, the control is ended when the variable k reaches 9.

A cutting method according to a comparative example will now be described. With reference to FIG. 1, according to the cutting method of the comparative example, a single relative movement of the tool 41 is repeated for the tool path p1 to the tool path p9 respectively to perform the cutting first. Then, back to the tool path p1, the steps of removing burrs are performed. In other words, the workpiece 1 is cut from the top 1a to the bottom 1b first, and then the workpiece is machined again for removing burrs based on the tool paths p1 to p9. The cutting method of the comparative example can be used to remove burrs produced on corners 1c. However, the cutting method of the comparative example results in lower machining accuracy due to wear of the tool, thermal deformation of the machine tool, and thermal deformation of the tool, occurring during the cutting. The thermal deformation of the machine tool may be, for example, thermal deformation caused by an increased temperature at the bearing which supports the spindle. Such wear of the tool or thermal deformation decreases machining accuracy.

In contrast, according to the cutting method of the present embodiment, the cutting step of cutting a workpiece is performed followed by the removal step of removing burrs. Performing the cutting step and the removal step successively based on a single tool path can minimize the influence of thermal deformation and tool wear. As a result, lowering the machining accuracy can be suppressed.

In addition, according to the first cutting method, the removal step is performed so as to make a relative movement of the tool with respect to the workpiece on the same tool path as the whole of one tool path for the cutting step. In other words, the removal tool path is identical to the cutting tool path. Accordingly, the removal tool path can be easily generated.

Although the present embodiment uses the same moving speed of the tool relative to the workpiece for both of the cutting step and the removal step, this configuration is not restrictive, and the moving speed in the cutting step may be different from the moving speed in the removal step.

For example, the removal tool path may include a straight area where the tool moves relative to the workpiece in a straight manner and a curved area where the tool moves relative to the workpiece in a curved manner so as to form a corner. A burr appears on a corner, but not on a planar portion. Thus, in the removal step, the moving speed in straight areas may be higher than the moving speed in curved areas.

Figure 7:
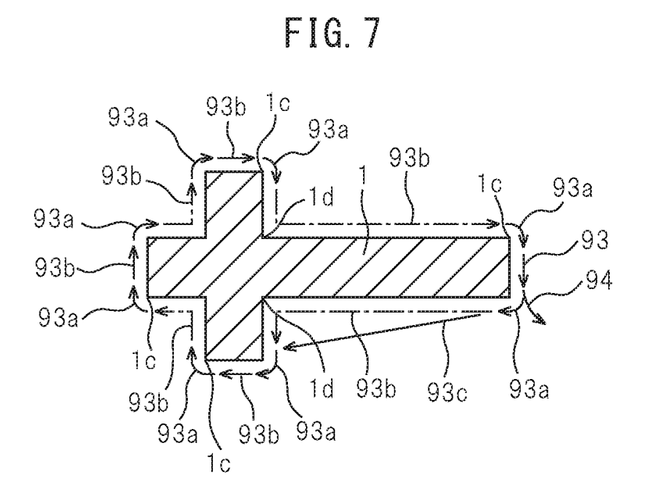
FIG. 7 is an explanatory schematic cross-sectional view illustrating another removal tool path for removing a burr produced on a corner of the first workpiece.

FIG. 7 is an explanatory schematic cross-sectional view of the workpiece illustrating another removal step according to the present embodiment. Arrows 93a and arrows 93b indicate a removal tool path. The arrows 93a indicate a tool path in curved areas where a burr 5 may be produced. A curved area preferably includes very small portions where the tool moves straight around the ends of a corner 1c. The arrows 93b indicate a tool path in straight areas where a burr is not produced. In this case, the moving speed in the areas indicated by the arrows 93b may be higher than the moving speed in the areas indicated by the arrows 93a.

This method ensures removal of burrs on a corner 1c, where burrs will be produced. At the same time, the machining time can be reduced owing to higher relative speed in straight areas. In this way, the machining time can be shortened while the high performance of removing burrs is maintained. Although in the example illustrated in FIG. 7 a portion forming an inward concave corner 1d is included in a straight area, this configuration is not restrictive, and an area forming an inward concave corner 1d may be included in a curved area.

In addition, although the aforementioned removal tool path for the relative movement of the tool 41 is the same tool path as the whole of one tool path for the cutting step and the relative movement of the tool 41 is performed, this configuration is not restrictive, and the relative movement may be made on a tool path deviating from the one tool path in areas on the one tool except the areas forming corners 1c. In other words, as for the removal tool path, as long as same tool path as the cutting tool path is used for the areas forming corners 1c, any tool path may be employed for other areas.

With reference to FIG. 7, a tool path indicated by arrows 93a is employed as the removal tool path, but a tool path indicated by arrows 93b may not necessarily be employed. For example, the removal tool path may include a tool path indicated by an arrow 93c so that the tool can, after machining one corner 1c, directly move to another nearby corner 1c to start machining. In other words, a tool path may be shorted in an area forming no corner 1c. This method can shorten the machining time.

The following describes scan machining, as a second cutting method of cutting a workpiece based on a plurality of tool paths parallel to one another. Scan machining is also referred to as scanning line machining. Scan machining involves relative movements of the tool with respect to a workpiece in a straight manner when the workpiece is seen from the axial direction of the spindle in the machine tool. Individual tool paths form straight lines when the workpiece is seen in a planar view. For example, as for the scan machining, tool paths appear straight lines when projected on an X-Y plane.

Figure 8:
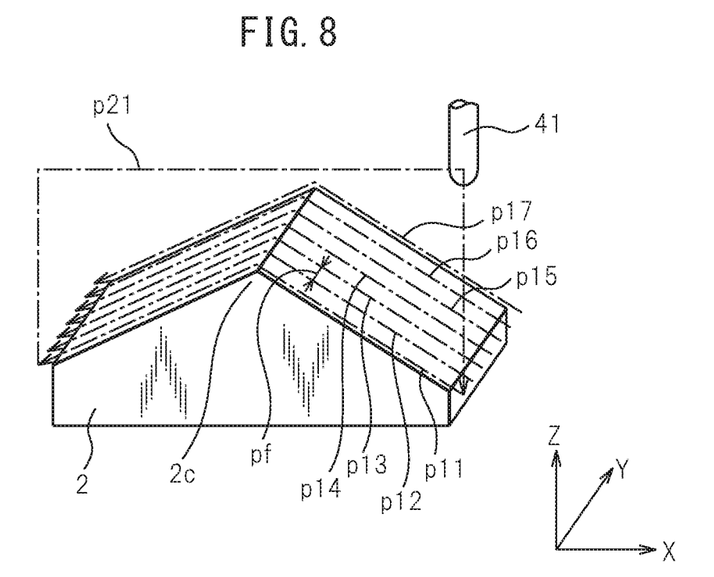
FIG. 8 is an explanatory schematic perspective view of a workpiece illustrating tool paths for machining a second workpiece according to an embodiment.

FIG. 8 is a schematic perspective view of the workpiece which has been machined into a target shape by using the second cutting method according to an embodiment. The second cutting method includes cutting a top surface of the workpiece 2. A ball end mill, for example, can be used as the tool 41. Machining is performed on the bottom face of the tool 41. To machine the workpiece 2, a plurality of tool paths p11 to p17 is defined. The tool paths p11 to p17 are parallel to one another, each spaced apart by the pick feed pf. The workpiece 2 which has been cut into the target shape has an outward projecting corner 2c.

Figure 9:
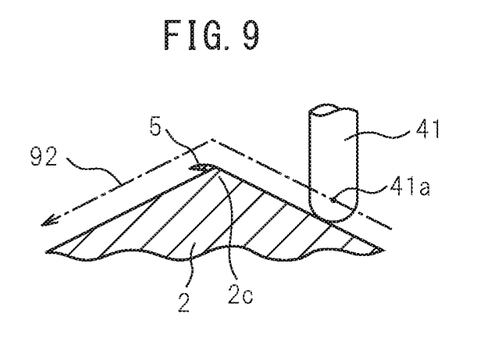
FIG. 9 is an enlarged schematic cross-sectional view of a corner of the second workpiece according to an embodiment.

FIG. 9 is an enlarged schematic cross-sectional view of a corner of the workpiece. An arrow 92 corresponds to a single tool path. For example, the arrow 92 corresponds to the tool path p11. To form a corner 2c, the tool path bends outward as indicated by the arrow 92. As a result, a burr 5 is produced on the corner 2c. Therefore, the second cutting method includes performing a machining step similar to the machining step of the first cutting method.

With reference to FIG. 8, the second cutting method also includes performing a machining step based on a single tool path. The machining step is performed a plurality of times. In the machining step, a cutting step is performed based on a cutting tool path and then a removal step is performed based on a removal tool path. For example, after performing the cutting step of cutting the workpiece 2 based on the tool path p11, the tool returns to the start point of the tool path p11 as indicated by the tool path p21. Then, a relative movement of the tool 41 is made along the tool path p11 to perform the removal step of removing burrs produced on the corner 2c. In the removal step, the tool 41 can be moved relative to the workpiece 2 along the same tool path and in the same direction as those for the cutting step. Upon completion of such machining step based on the tool path p11, the moving step is performed to move to the start point of the next machining step which is based on the tool path p12. Then, the machining step based on the tool path p12 is performed. Furthermore, similar machining step and moving step are performed up to the tool path p17.

Although the tool paths p11 to p17 illustrated in FIG. 8 are all oriented in the same direction, this configuration is not restrictive, and some of the tool paths may be oriented in the opposite direction. For example, the cutting tool path in the machining step based on the tool path p12 may be oriented in the direction opposite to the direction in which the cutting tool path is oriented in the machining step based on the tool path p11. The paths may be oriented in either direction as long as the moving direction of the cutting step is the same as the moving direction of the removal step in a single machining step.

As with the first cutting method, the second cutting method allows for performing the removal step based on the same tool path as the whole of one tool path for the cutting step. In addition, in the removal step, the relative moving speed of the tool in a straight area may be higher than the relative moving speed of the tool in a curved area. Moreover, for the removal step in areas other than the area where a corner is formed, a tool path different from the tool path used for the cutting step may be employed. As seen above, the present invention can also be applied to the cases where scan machining is performed.

Although the second cutting method includes moving the tool relative to the workpiece in a straight manner when seen in a planar view, this configuration is not restrictive, and the relative movement of the tool may be made in a curved manner when seen in a planar view. Such a machining method is referred to as path machining. The present invention can also be applied to path machining.

A tool path generation device will now be described. The tool path generation device of the present embodiment can generate machining tool paths according to the above-described first cutting method and second cutting method.

Figure 10:
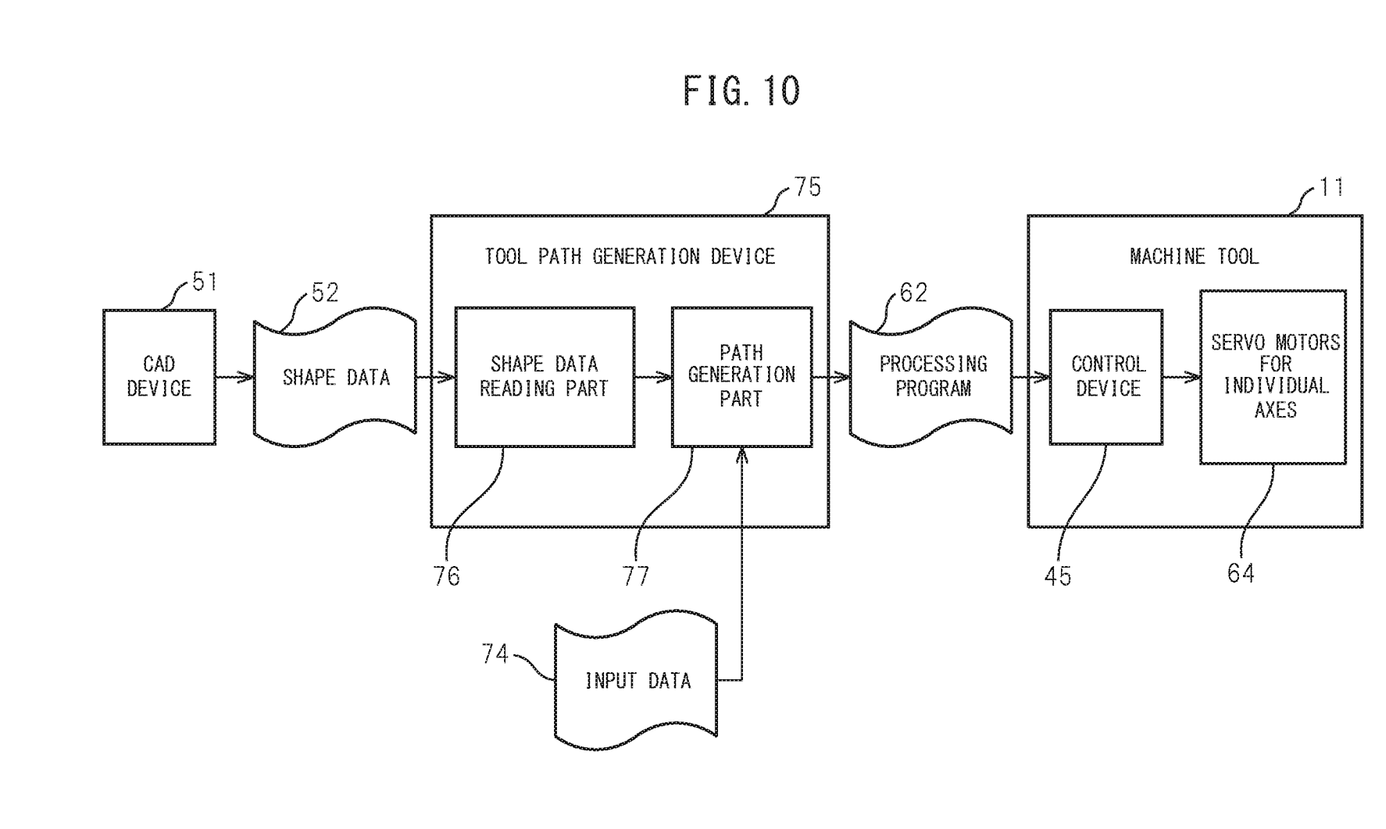
FIG. 10 is a block diagram of a machining system according to an embodiment.

FIG. 10 shows a schematic view illustrating a machining system which includes the machine tool and the tool path generation device according to the present embodiment. In the present embodiment, shapes of the workpieces 1 and 2 are designed in a CAD (computer aided design) device 51. The CAD device 51 supplies shape data 52 for the workpieces 1 and 2 to the tool path generation device 75. The shape data 52 includes data for the target shapes of the workpieces 1 and 2.

The tool path generation device 75 has functions of a CAM (computer aided manufacturing) device. Based on the shape data 52 and input data 74, the tool path generation device 75 generates numerical input data, i.e., a processing program 62, which is to be input to a control device 45 in the machine tool 11. The input data 74 may include information about, for example, machining conditions such as the type of the tool to be used and the type of the machine tool.

The tool path generation device 75 according to the present embodiment includes a shape data reading part 76 and a path generation part 77. The shape data reading part 76 of the present embodiment reads the shape data 52, which includes a target shape to be obtained after the workpiece 1 is machined. The path generation part 77 generates the processing program 62 based on the shape data 52 for the workpiece 1 and the input data 74.

The control device 45 in the machine tool 11 drives the servo motors for individual axes 64 based on the processing program 62. The tool 41 can be moved relative to the workpiece 1 or 2. The servo motors for individual axes 64 include an X-axis servo motor, a Y-axis servo motor, and a Z-axis servo motor.

The tool path generation device will now be described in more detail by illustrating, as an example, how a tool path based on the first cutting method is generated. Note that the tool path generation device can similarly generate a tool path based on the second cutting method.

The path generation part 77 generates a machining tool path for machining the workpiece 1 based on one tool path, as well as generating a moving tool path for moving, after the machining based on the one tool path is finished, to the start point of a machining tool path based on another tool path parallel to the one tool path.

With reference to FIG. 1, FIG. 4, and FIG. 5, the path generation part 77 generates the tool path p1 based on the target shape of the workpiece 1. Next, based on the tool path p1, the path generation part 77 generates a cutting tool path for cutting the workpiece, as indicated by the arrow 92 in FIG. 4. In addition, the path generation part 77 generates a removal tool path for removing burrs, as indicated by the arrow 93 in FIG. 5. In this way, the path generation part 77 generates a machining tool path which includes a cutting tool path and a removal tool path.

Next, the path generation part 77 generates machining tool paths based on the tool paths p2 to p9 except the tool path p1. The path generation part 77 then generates moving tool paths for connecting the respective machining tool paths with each other. The tool path generation device 75 according to the present embodiment can generate tool paths which prevent burrs from being left.

The tool path generation device 75 generates a machining tool path by generating a cutting tool path based on one tool path and generating in succession a removal tool path based on the one tool path. In other words, the cutting tool path illustrated in FIG. 4 and the removal tool path illustrated in FIG. 5 are defined in succession. This makes it possible to generate a tool path which reduces the influence of thermal deformation and tool wear to inhibit lowering the machining accuracy.

With reference to FIG. 10, the operator makes settings in the input data 74 so that a removal step of removing burrs will be performed. After reading a flag for performing the removal step, the path generation part 77 generates a removal tool path in addition to the cutting tool path. Whether a burr 5 will be produced depends on the angle of a corner 1c, the material included in the workpiece 1, the rotation speed of the tool 41, the relative moving speed of the tool 41 with respect to the workpiece 1, and the like. When the operator predicts that the present machining is likely to produce a burr 5, he preferably operates the tool path generation device so as to generate the removal tool path according to the present invention.

As described above, a tool path identical to the whole of the cutting tool path can be employed as a removal tool path. Alternatively, the path generation part 77 may define an area forming a corner 1c, and may generate a removal tool path which deviates from the cutting tool path in the areas other than the area forming the corner 1c. For example, the removal tool path may be shorted in an area where no corner 1c is formed.

Although the cutting method according to the present embodiment includes, after completion of a machining step based on one tool path, a machining step based on another tool path adjacent to the one tool path is performed, this configuration is not restrictive, and the machining step may be performed based on another tool path being distant from the one tool path. In other words, the cutting operations based on a plurality of tool paths parallel to one another may be performed in any order.

Although the above description of the embodiment takes an end mill as an example of the tool, this configuration is not restrictive, and any milling cutter tool capable of cutting operations may be employed.

In addition, machine tools are not limited to the one according to the above-described embodiment, and any machine capable of moving a tool relative to a workpiece and capable of cutting the workpiece may be employed as the machine tool. For example, a machining center which uses a tool such as an end mill to perform cutting or a machine tool such as a milling machine may be used. Although the numerical control type machine tool according to the present embodiment is configured with a plurality of linear feed axes, this configuration is not restrictive, and the machine tool may include a rotational feed axis.

Aforementioned embodiments may be combined as appropriate. Throughout the individual drawings mentioned above, identical reference symbols are given to identical or equivalent parts. The above embodiments are examples only and the present invention is not limited thereto. The embodiments include any modification indicated in the claims.

REFERENCE SIGNS LIST 1, 2 Workpiece
1c, 2c Corner
5 Burr
41 Tool
45 Control device
74 Input data
75 Tool path generation device
77 Path generation part
p1 to p9, p11 to p17 Tool path

The invention claimed is:

1. A cutting method with a machine tool for cutting a workpiece based on a plurality of tool paths parallel to one another, each spaced apart by a pick feed, to machine the workpiece into a shape which includes a corner projecting outward, the method comprising:
   a machining step of machining, using a tool, the workpiece based on one tool path, the machining step comprising,
      a cutting step of cutting the workpiece using the tool along the one tool path, and
      a removal step of removing a burr by making a relative movement of the tool with respect to the workpiece on the same tool path and in the same direction as the direction for the cutting step at least in an area forming the corner, the burr being produced in the cutting step by making the relative movement of the tool with respect to the workpiece along a shape of the corner projecting outward, and the cutting step based on the one tool path and the removal step being performed in succession;
   a moving step of moving the tool to a start point of another tool path parallel to the one tool path and spaced apart by the pick feed from the one tool path after completion of the machining step based on the one tool path; and
   a repeating step of repeating the machining step and the moving step.

2. The cutting method according to claim 1, wherein the removal step includes a step of removing a burr by making a relative movement of the tool with respect to the workpiece on the same tool path as the whole of the one tool path.

3. The cutting method according to claim 2, wherein
   the one tool path includes a straight area where a relative movement of the tool is made with respect to the workpiece in a straight manner and a curved area forming the corner, and
   the removal step includes a step of making a relative speed of the tool with respect to the workpiece in the straight area higher than a relative speed of the tool with respect to the workpiece in the curved area.

4. The cutting method according to claim 1, wherein the removal step includes a step of making a relative movement on a tool path which deviates from the one tool path in areas on the one tool path except an area forming the corner.

5. The cutting method according to claim 1, wherein the machining step includes a step of machining on a side of the tool while keeping the tool at a certain relative position with respect to the workpiece in an axial direction of a spindle in the machine tool.

6. The cutting method according to claim 1, wherein the machining step includes a step of machining on a bottom of the tool while making a relative movement of the tool with respect to the workpiece in a straight manner when the workpiece is seen from an axial direction of a spindle in the machine tool.

7. A tool path generation device generating tool paths for machining a workpiece into a shape with a corner projecting outward, the tool paths including a plurality of tool paths parallel to one another, each spaced apart by a pick feed, for cutting the workpiece, the tool path generation device comprising a non-transitory storage media storing thereon a program that, when executed by a computer, performs the steps of:

generating a machining tool path for machining, using a tool, the workpiece based on one tool path, the generating comprising, generating a cutting tool path including the one tool path for cutting the workpiece using the tool, and generating a removal tool path for removing a burr by making a relative movement of the tool with respect to the workpiece on the same tool path and in the same direction as the direction for the cutting tool path at least in an area where the corner is formed, the burr being produced by making the relative movement of the tool with respect to the workpiece along a shape of the corner projecting outward based on the cutting tool path, moving the tool to a start point of another machining tool path parallel to the one tool path and spaced apart by the pick feed from the one tool path after completion of machining based on the one tool path; and repeating the generating of the machining tool path and the moving of the tool.

8. The tool path generation device according to claim 7, wherein the steps further comprises setting an area where the corner is formed, and generating the removal tool path which deviates from the one tool path in areas except an area where the corner is formed.

* * * * *